United States Patent
Shen et al.

(10) Patent No.: US 11,502,501 B2
(45) Date of Patent: Nov. 15, 2022

(54) OVERCURRENT PROTECTION CIRCUIT AND BI-DIRECTIONAL CONVERTER

(71) Applicant: Delta Electronics (Shanghai) CO., LTD, Shanghai (CN)

(72) Inventors: Guoqiao Shen, Shanghai (CN); Jinfa Zhang, Shanghai (CN); Yuhu Zhou, Shanghai (CN)

(73) Assignee: Delta Electronics (Shanghai) CO., LTD, Shanghai (CN)

(*) Notice: Subject to any disclaimer, the term of this patent is extended or adjusted under 35 U.S.C. 154(b) by 135 days.

(21) Appl. No.: 17/104,119

(22) Filed: Nov. 25, 2020

(65) Prior Publication Data

US 2021/0226440 A1 Jul. 22, 2021

(30) Foreign Application Priority Data

Jan. 21, 2020 (CN) .......................... 202010070469.8

(51) Int. Cl.
| | |
|---|---|
| *H02H 3/00* | (2006.01) |
| *H02H 3/087* | (2006.01) |
| *H02H 1/00* | (2006.01) |
| *H02H 7/10* | (2006.01) |

(52) U.S. Cl.
CPC .......... *H02H 3/087* (2013.01); *H02H 1/0007* (2013.01); *H02H 7/10* (2013.01)

(58) Field of Classification Search
None
See application file for complete search history.

(56) References Cited

U.S. PATENT DOCUMENTS

| | | | |
|---|---|---|---|
| 2014/0028233 A1* | 1/2014 | Lee | ...................... H02H 7/0838 318/474 |
| 2014/0233140 A1 | 8/2014 | Gaxiola | |
| 2015/0171617 A1 | 6/2015 | Gaxiola et al. | |
| 2018/0076727 A1 | 3/2018 | Bakran et al. | |
| 2018/0241202 A1 | 8/2018 | Mokhberdoran et al. | |
| 2021/0226439 A1* | 7/2021 | Li | ........................... H02H 7/28 |

FOREIGN PATENT DOCUMENTS

| | | |
|---|---|---|
| CN | 106159899 A | 11/2016 |
| WO | 2017220443 A1 | 12/2017 |

OTHER PUBLICATIONS

The Extended European Search Report dated May 26, 2021 for EP patent application No. 21151016.9.

* cited by examiner

*Primary Examiner* — Stephen W Jackson
(74) *Attorney, Agent, or Firm* — Qinghong Xu

(57) ABSTRACT

The invention discloses an overcurrent protection circuit, coupled to a DC bus between first and second DC ends, the DC bus including positive bus and negative bus, and the circuit including: a main protection branch connected in series with the positive or negative bus, and including first and second protection switches connected in series and connected to a first node; a freewheeling switch branch having two ends, one end being connected to the first node, the other end being connected to an opposite bus to the main protection branch; a detection unit coupled to the DC bus for detecting a voltage or a current of the DC bus to output an overcurrent detection signal; and a control unit coupled to the detection unit and the main protection branch, and configured to control the main protection branch according to the overcurrent detection signal.

23 Claims, 26 Drawing Sheets

OVERCURRENT PROTECTION CIRCUIT AND BI-DIRECTIONAL CONVERTER

TECHNICAL FIELD

The present disclosure relates to the field of power supply circuit technology, and more particularly, to an overcurrent protection circuit of DC bus and a bi-directional converter.

BACKGROUND

In many applications such as DC power supplies and inverters, faults such as short circuit may occur at DC input ports, output ports, internal circuits or external loads. In order to avoid serious consequences of overcurrent, abnormal current and energy must be removed from the system as soon as possible.

Quick fuse is widely used for overcurrent and short-circuit protection. However, in the application of quick fuse, the fault current is usually tens of times larger than the rated current of the circuit, which is easy to damage sensitive components. And the protection time of the quick fuse often needs several seconds or even tens of seconds, which is too long and easy to cause heat damage to some circuits or components.

It should be noted that the information disclosed in the above Background section is only for enhancement of understanding of the background of the present disclosure, thus it may include information that does not belong to the prior art known to those skilled in the art.

SUMMARY

The present disclosure aims at providing an overcurrent protection circuit and a bi-directional converter able to realize quick overcurrent detection and circuit protection, for solving the problems that it is easy to damage components and reduce lifetime of the components when performing circuit overcurrent detection and protection due to limitations and defects in the related art at least to a certain extent.

According to a first aspect of the embodiments of the present disclosure, there is provided an overcurrent protection circuit, coupled to a DC bus between a first DC end and a second DC end. The DC bus includes a positive bus connected between a first DC positive terminal and a second DC positive terminal, and a negative bus connected between a first DC negative terminal and a second DC negative terminal. The overcurrent protection circuit includes: a main protection branch, a freewheeling switch branch, a detection unit and a control unit. The main protection branch is connected in series with the positive bus or the negative bus, and comprises a first protection switch and a second protection switch connected in series and connected to a first node on the bus. The freewheeling switch branch has two ends, and one end is connected to the first node on the bus, the other end is connected to an opposite bus to the main protection branch. The detection unit is coupled to the DC bus, and configured to detect a voltage or a current of the DC bus and outputs an overcurrent detection signal for representing whether an overcurrent occurs. The control unit is coupled to the detection unit and configured to control the main protection branch according to the overcurrent detection signal.

According to a second aspect of the present disclosure, there is provided an overcurrent protection circuit, coupled to a DC bus between a first DC end and a second DC end. The DC bus includes a positive bus connected between a first DC positive terminal and a second DC positive terminal, and a negative bus connected between a first DC negative terminal and a second DC negative terminal. The overcurrent protection circuit includes: a main protection branch, a first freewheeling switch branch, a second freewheeling switch branch, a detection unit and a control unit. The main protection branch is connected series with the positive bus or the negative bus, and comprises at least one protection switch. The first freewheeling switch branch has two ends, and one end is connected to a first end of the main protection branch, and the other end is connected to an opposite bus to the main protection branch. The second freewheeling switch branch has two ends, and one end is connected to a second end of the main protection branch, the other end is connected to an opposite bus to the main protection branch. The detection unit is coupled to the DC bus, and configured to detect a voltage or a current of the DC bus and outputs an overcurrent detection signal for representing whether an overcurrent occurs. The control unit is coupled to the detection unit and controls the main protection branch according to the overcurrent detection signal.

According to a third aspect of the present disclosure, there is provided a bi-directional converter. An input end or an output end of the bi-directional converter is coupled with the overcurrent protection circuit according to any one of the above.

It should be understood that the general description hereinbefore and the detailed description hereinafter are for illustrative purposes only and are not intended to limit the scope of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that the accompanying drawings in the following description are only some of the embodiments of the present disclosure, and for those skilled in the art, other drawings may be obtained without creative work according to these accompanying drawings.

DETAILED DESCRIPTION

Figure 1A:
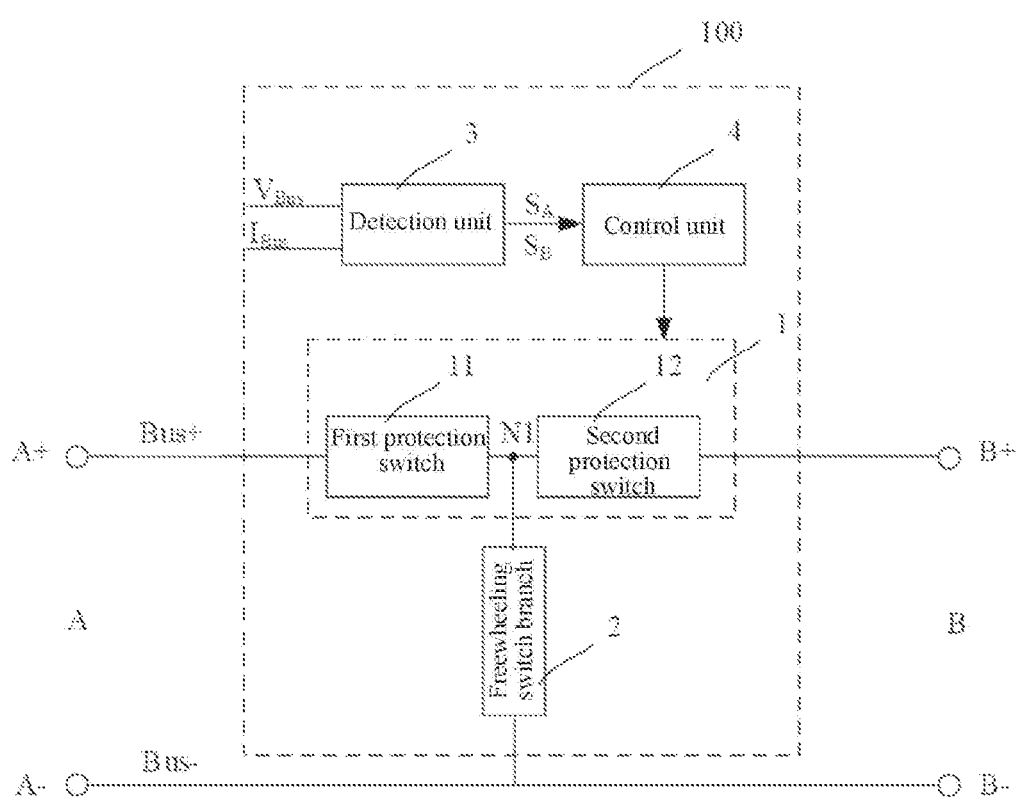
FIG. 1A and FIG. 1B are schematic diagrams of overcurrent protection circuits according to a first embodiment and a second embodiment in the exemplary embodiments of the present disclosure.

Exemplary embodiments will now be described more fully with reference to the drawings. However, the exemplary embodiments may be embodied in a variety of forms and should not be explained as being limited to the embodiments set forth herein; instead, these embodiments are provided to make the present disclosure more thorough and complete, and fully convey the concept of the exemplary embodiments to those skilled in the art. The described features, structures, or characteristics may be combined in any suitable way in one or more embodiments. In the following description, numerous specific details are set forth for full understanding of the embodiments of the present disclosure. However, those skilled in the art will understand that the technical solutions of the present disclosure may be practiced without one or more of the specific details, or other methods, components, devices, steps, etc. may be employed. In other instances, well-known technical solutions are not shown or described in detail to avoid obscuring various aspects of the present disclosure.

Furthermore, the accompanying drawings are merely schematic illustrations of the present disclosure, the same reference numerals in the drawings denote the same or similar parts, and thereby repeated description thereof will be omitted. Some of the block diagrams shown in the drawings are functional entities and do not necessarily have to correspond to physically or logically independent entities. These functional entities may be implemented in software, or implemented in one or more hardware modules or integrated circuits, or implemented in different network and/or processor devices and/or micro control unit devices.

Exemplary embodiments of the present disclosure are described in detail below with reference to the accompanying drawings.

Figure 1B:
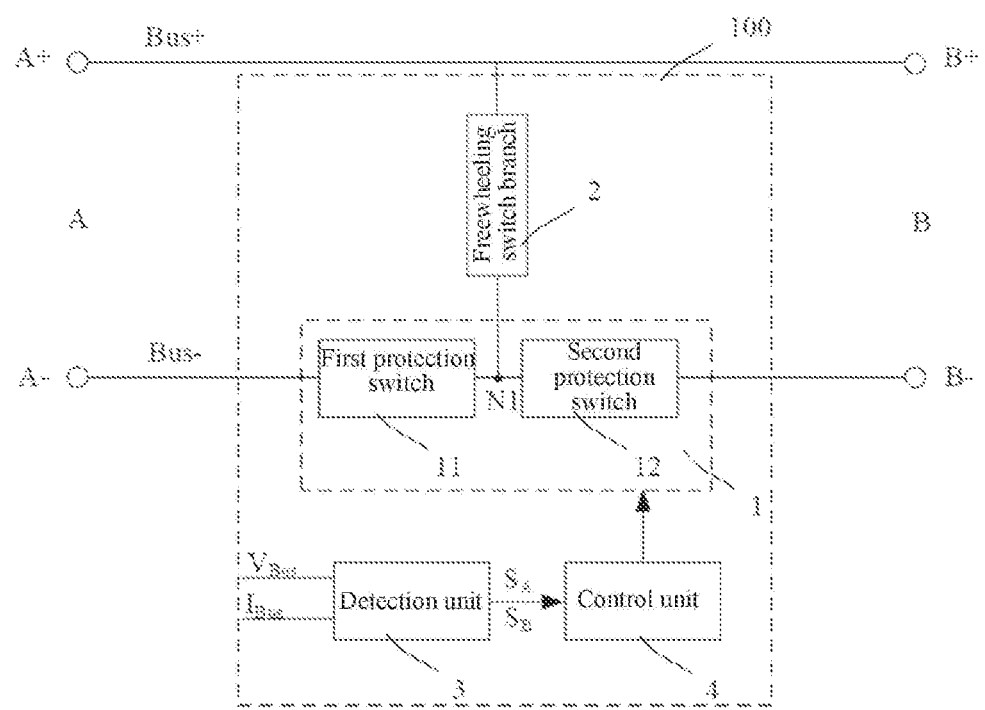

FIG. 1A and FIG. 1B are schematic diagrams of overcurrent protection circuits according to a first embodiment and a second embodiment of the present disclosure.

Referring to FIG. 1A and FIG. 1B, an overcurrent protection circuit 100 is coupled to a DC bus between a first DC end A and a second DC end B, the DC bus includes a positive bus Bus+ and a negative bus Bus−, the positive bus Bus+ is connected between a first DC positive terminal A+ and a second DC positive terminal B+, the negative bus Bus− is connected between a first DC negative terminal A− and a second DC negative terminal B−.

Wherein, the overcurrent protection circuit 100 may include: a main protection branch 1, a freewheeling switch branch 2, a detection unit 3 and a control unit 4. As shown in FIG. 1A, the main protection branch 1 is connected in series with the positive bus Bus+, and the main protection branch 1 includes a first protection switch 11 and a second protection switch 12 that are connected to a first node N1 in series. The freewheeling switch branch 2 has two ends, one end is connected to the first node N1, the other end is connected to the negative bus Bus−. As shown in FIG. 1B, the main protection branch 1 is connected to the negative bus Bus−, one end of the freewheeling switch branch 2 is connected to the first node N1, the other end is connected to the positive bus Bus+. The detection unit 3 is coupled with the DC bus, and detects a voltage $V_{bus}$ or a current $I_{bus}$ of the DC bus in real time and outputs an overcurrent detection signal for representing whether an overcurrent or overcurrent fault occurs. The control unit 4 is coupled with the detection unit 3 and the main protection branch 1, and the control unit 4 is configured to control the main protection branch 1 according to the overcurrent detection signal. Wherein, overcurrent fault includes not only short-circuit over-current fault, but also other overcurrent fault; and overcurrent may be caused by short-circuit fault or other fault.

Wherein, in normal operation, the main protection branch 1 is in a conduction state, the first protection switch 11 and the second protection switch 12 are turned on by default, and the freewheeling switch branch 2 is turned off by default.

According to an exemplary embodiment of the present disclosure, the overcurrent detection signal includes a first overcurrent signal $S_A$ identifying an overcurrent fault happening in the first DC end A and a second overcurrent signal $S_B$ identifying an overcurrent fault happening in the second DC end B. The detection unit 3 is used to determine and output the first overcurrent signal $S_A$ or the second overcurrent signal $S_B$ according to a voltage $V_{bus}$ or current $I_{bus}$ sampled in real time on the DC bus.

When receiving the first overcurrent signal $S_A$, the control unit 4 controls the second protection switch 12 to be turned off to protect the circuit of the second DC end B; and when receiving the second overcurrent signal $S_B$, the control unit 4 controls the first protection switch 11 to be turned off to protect the circuit of the first DC end A. At the same time, the freewheeling switch branch 2 is conductive to provide a freewheeling loop for the overcurrent end. In some embodiments, if the freewheeling switch branch includes a controllable switch, the control unit 4 is further coupled with the freewheeling switch branch 2, and controls the freewheeling switch branch 2 to be turned on according to the overcurrent detection signal (whether the first overcurrent signal $S_A$ or the second overcurrent signal $S_B$), so as to provide a freewheeling loop for the overcurrent end.

Figure 2A:
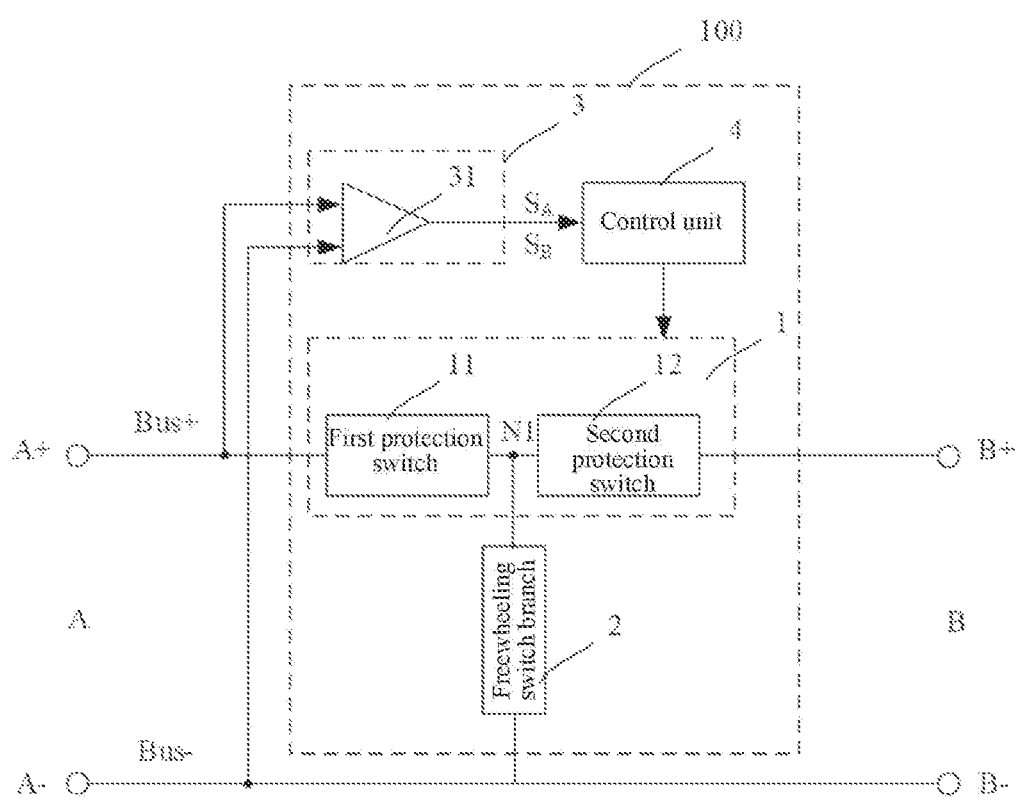
FIG. 2A and FIG. 2B are circuit connection diagrams of a detection unit according to two embodiments of the present disclosure respectively.
Figure 2B:
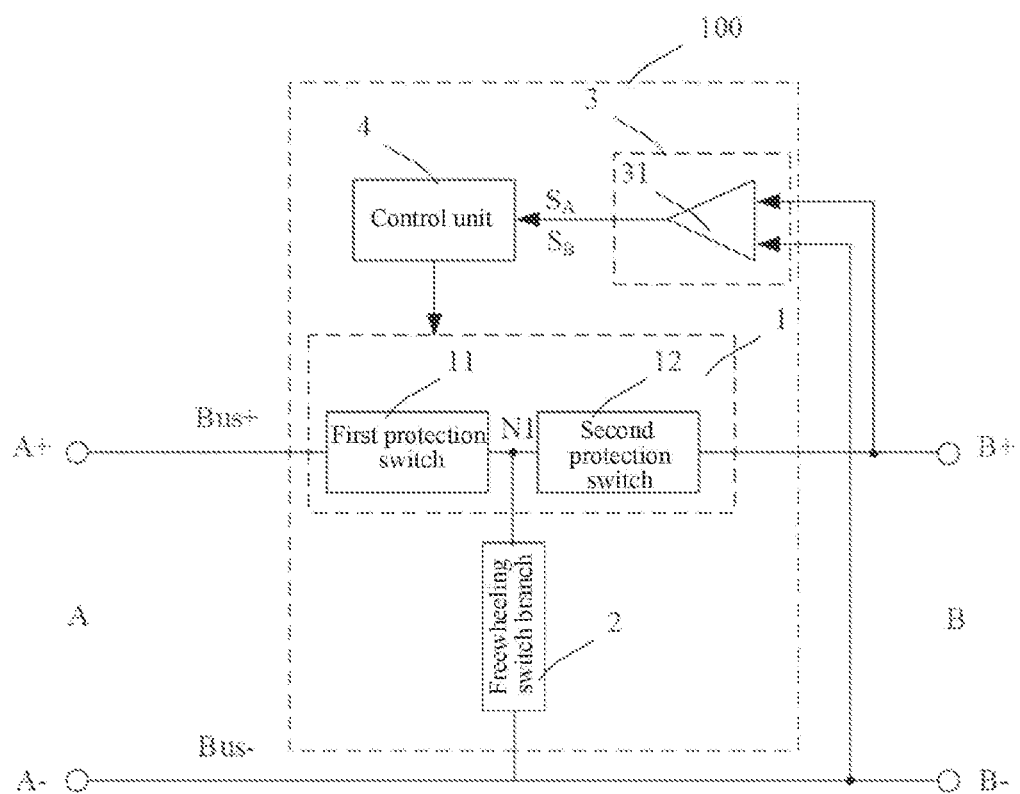

FIG. 2A and FIG. 2B are circuit connection diagrams of a detection unit according to two embodiments of the present disclosure respectively. In the embodiments shown in FIG. 2A, the detection unit 3 is coupled to the positive bus Bus+ and the negative bus Bus− at the first DC end A. In the embodiments shown in FIG. 2B, the detection unit 3 is coupled to the positive bus Bus+ and the negative bus Bus− at the second DC end B. The detection unit 3 detects a voltage between the positive bus Bus+ and the negative bus Bus−, and outputs an overcurrent detection signal when a change of voltage (such as a magnitude of the voltage example, when the change of voltage between the positive bus Bus+ and the negative bus Bus− at the first DC end A drops sharply beyond the preset voltage threshold, the first overcurrent signal $S_A$ may be output; and when the change of voltage between the positive bus Bus+ and the negative bus Bus− at the second DC end B drops sharply beyond the preset voltage threshold, the second overcurrent signal $S_B$ may be output.

In the embodiments of the present disclosure, the detection unit 3 may realize a voltage measurement between the positive bus Bus+ and the negative bus Bus− via an operational amplifier 31.

In the embodiment shown in FIG. 2A, a first input end and a second input end of the operational amplifier 31 are coupled to the first DC positive terminal A+ and the first DC negative terminal A− respectively, for detecting the voltage $V_{bus}$ between the positive bus Bus+ and the negative bus Bus− at the first DC end A. In the embodiment shown in FIG. 2B, a first input end and a second input end of the operational amplifier 31 are coupled to the second DC positive terminal B+ and the second DC negative terminal B−, for detecting the voltage $V_{bus}$ between the positive bus Bus+ and the negative bus Bus− at the second DC end B.

Figure 3A:
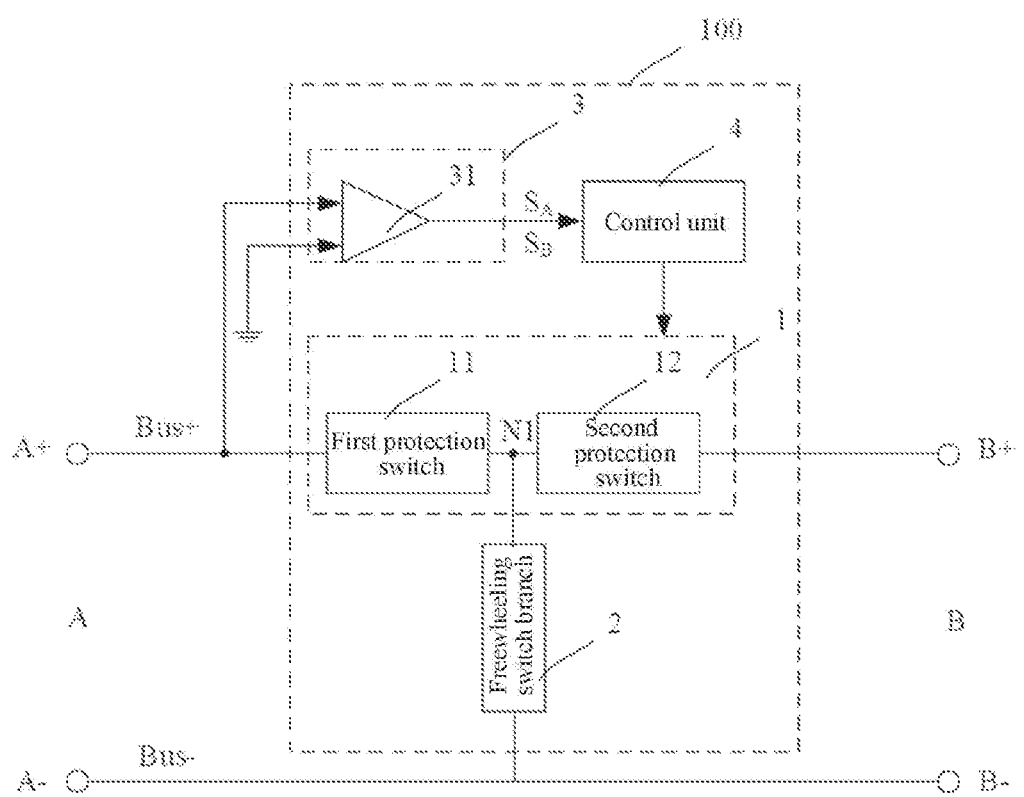
FIG. 3A and FIG. 3B are circuit connection diagrams of a detection unit according to another two embodiments of the present disclosure respectively.
Figure 3B:
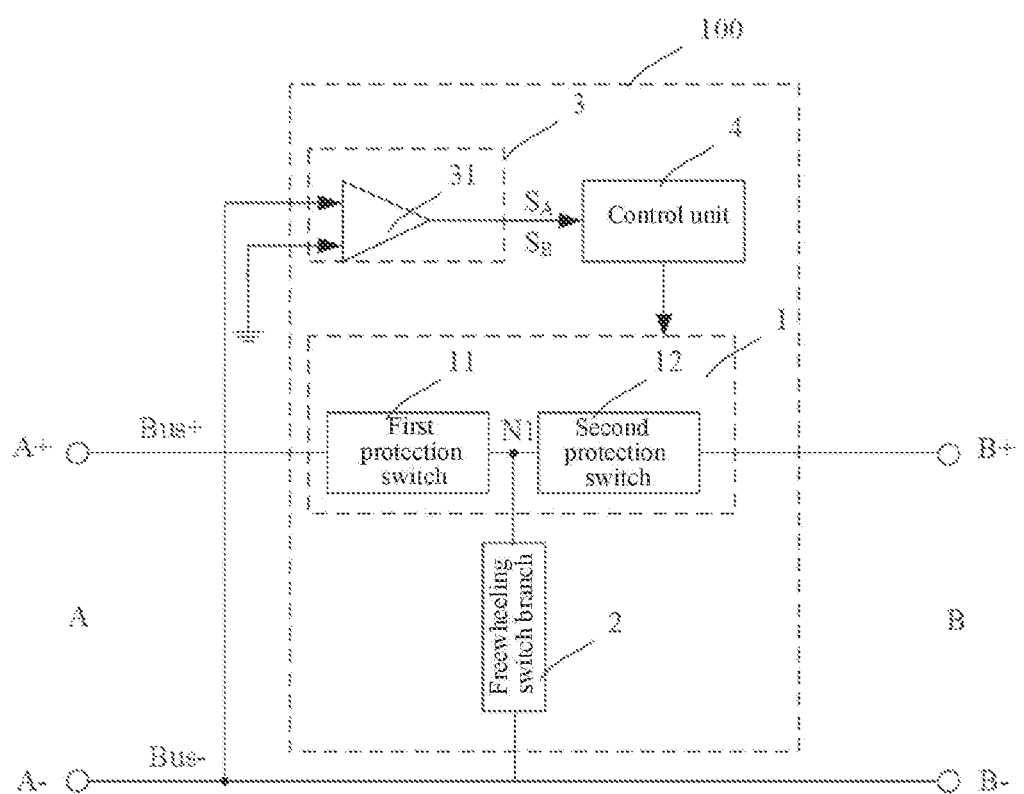

FIG. 3A and FIG. 3B are circuit connection diagrams of a detection unit according to another embodiments of the present disclosure respectively. In the embodiment shown in FIG. 3A, the detection unit 3 is coupled to the positive bus Bus+, for detecting a current $I_{bus}$ of the DC bus. Taking that the current flowing from the first DC positive terminal A+ to the second DC positive terminal B+ is positive as an example, when the current $I_{bus}$ is positive and the absolute value of the current $I_{bus}$ exceeds a preset current threshold, the second overcurrent signal $S_B$ is output; or when the current $I_{bus}$ is negative and the absolute value of the current exceeds a preset current threshold, the first overcurrent signal $S_A$ is output. In the embodiment shown in FIG. 3B, the detection unit 3 is coupled to the negative bus Bus−.

In the embodiments shown in FIG. 3A and FIG. 3B, a first input end of the operational amplifier 31 may be coupled to the positive bus or the negative bus, and a second input end of the operational amplifier 31 may be coupled to the ground, so as to determine a current direction and a current absolute value.

It should be noted that, the positive or negative of the voltage or current above-mentioned is determined with a reference of a certain direction, and if the reference or the direction is changed, the determination of positive or negative will be change. The present disclosure does not limit this relative relationship.

Figure 4A:
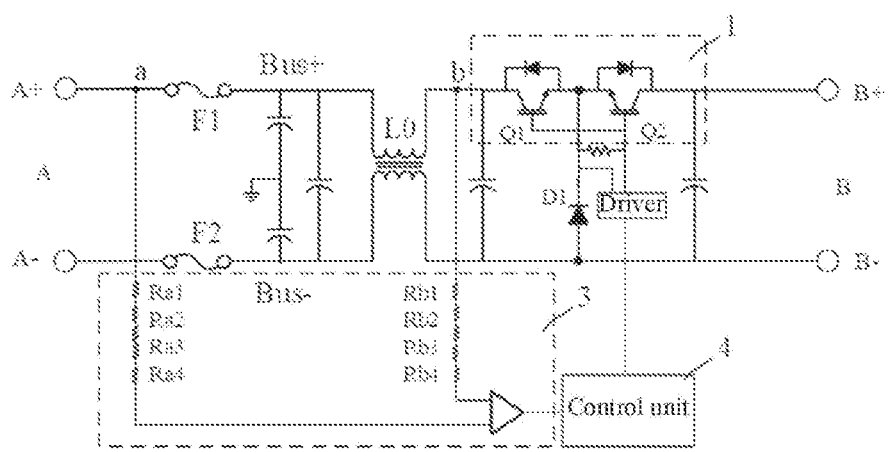
FIG. 4A and FIG. 4B are circuit connection diagrams of overcurrent protection circuit according to further another two of embodiments of the present disclosure respectively.
Figure 4B:
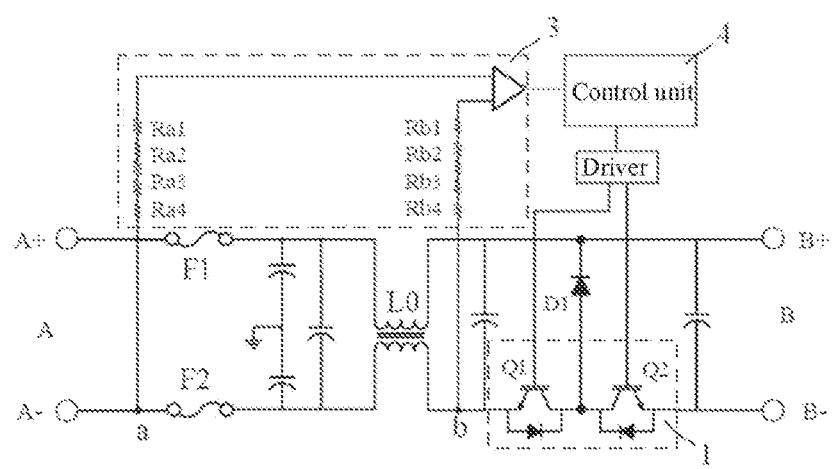

FIG. 4A and FIG. 4B are circuit connection diagrams of overcurrent protection circuit according to further another two embodiments of the present disclosure respectively. In some embodiments, the first DC end A may be a connection port for a DC source or a load port. Referring to FIG. 4A and FIG. 4B, the first DC end A is provided with a common-mode and differential-mode filter inductor Lo, a filter capacitor and positive-negative pole fuses F1 and F2; and the second DC end B may be used to connect to a power converter, an energy storage component or other DC power supplies or loads.

In the embodiments, the detection unit 3 may be coupled to two different positions on the positive bus Bus or two different positions on the negative bus Bus−, for detecting a voltage difference between the two detection positions.

As shown in FIG. 4A, the main protection branch 1 is set on the positive bus Bus+, and the detection unit 3 is coupled to a point a and a point b on the positive bus Bus+, for detecting a voltage difference between the point a and the point b to determine whether there is an overcurrent. In some other embodiments the detection unit 3 may be coupled to two points located before and after the filter inductor Lo, for detecting a voltage difference before and after the filter inductor Lo. It should be noted that the present disclosure does not limit positions of the two points (a, b) on the bus. Further, the position of the detection unit and the position of the main protection branch 1 may be set in the same bus or different bus.

When the voltage difference exceeds a preset positive threshold, the detection unit 3 outputs a second overcurrent signal $S_B$, and the control unit 4 controls the first protection switch (that is, Q1 in FIG. 4A) to be switched off; and when the voltage difference exceeds a preset negative threshold, the detection unit 3 outputs a first overcurrent signal $S_A$, and the control unit 4 controls the second protection switch (that is, Q2 in FIG. 4A) to be switched off. The protection is performed through the overcurrent protection circuit, leaving dangerous energy of overcurrent port away from the other side.

In the embodiments shown in FIG. 4B, the main protection branch 1 is set on the negative bus Bus−, the detection unit 3 is coupled to a point before the fuse F2 and a point after the filter inductor Lo on the negative bus Bus− (i.e., points a and b), for detecting a voltage difference between the points located before and after the filter inductor Lo and the fuse F2.

In FIG. 4A and FIG. 4B, an equivalent circuit between the point a and the point b is a series circuit of a resistor Rs and an inductor Ls. Rs includes a line resistor of the filter inductor and a DC resistor of the fuse. Ls includes an equivalent differential-mode inductance of the filter inductor and a line distributed inductor.

A voltage $V_{ab}$ between the point a and the point b of the above-mentioned equivalent circuit includes two parts and conforms to the following formula:

$$V_{ab} = i*R_s + L_s \frac{d_i}{d_t} \quad (1)$$

For example, when the circuit is short, the current rises rapidly from small value, and the voltage mainly appears as the voltage drop across the inductor Ls at this moment; and when the current value is relatively large, the inductor tends to be saturated and the voltage mainly appears as the voltage of the resistor Rs. Therefore, the voltage difference between the two points can be important basis for determining whether there is an overcurrent or a short-current in the circuit, which has the advantageous for easy detection and strong anti-interference ability.

Figure 5:
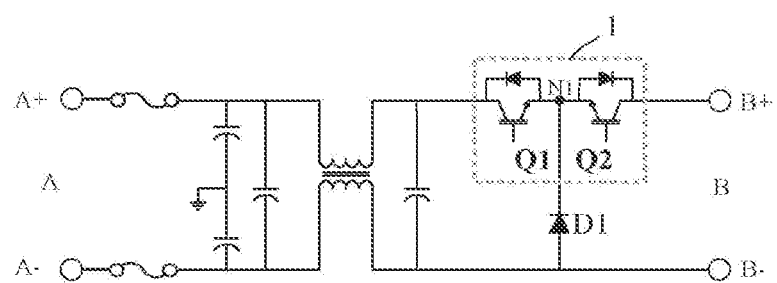
FIG. 5 is a circuit schematic diagram of a main protection branch according to an embodiment of the present disclosure.
Figure 6:
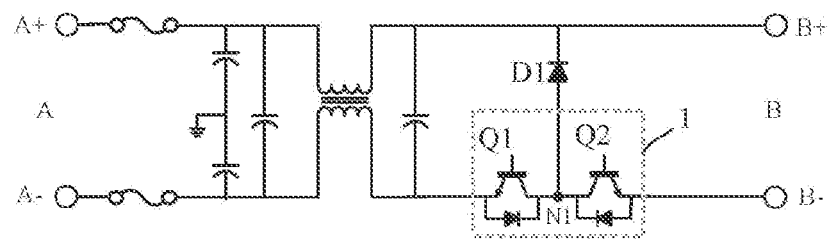
FIG. 6 is a circuit schematic diagram of a main protection branch according to another embodiment of the present disclosure.

FIG. 5 and FIG. 6 are respectively a circuit schematic diagram of a main protection branch according to two embodiments of the present disclosure, and the first protection switch Q1 and the second protection switch Q2 are reversely connected in series. Wherein, the first protection switch and the second protection switch can be both IGBTs or MOSFETs. The freewheeling switch branch 2 may be a diode D1. The first protection switch Q1 and the second protection switch Q2 both have a first end, a second end and a control end. In the embodiment shown in FIG. 5, the main protection branch 1 is located on the positive bus Bus+, the second end of the first protection switch Q1 and the second end of the second protection switch Q2 are connected at the first node N1 to form a reverse series structure. A cathode of the diode D1 is coupled to the first node N1, and an anode of the diode is coupled to negative bus Bus−. In the embodiment shown in FIG. 6, the main protection branch 1 is located on the negative bus Bus−, the first end of the first protection switch Q1 and the first end of the second protection switch Q2 are connected at the first node N1 to form a reverse series structure. The anode of the diode D1 is coupled to the first node N1, and a cathode of the diode is coupled to positive bus Bu+. A freewheeling loop is provided for the second DC end B when the first protection switch Q1 is switched off, or a freewheeling loop is provided for the first DC end A when the second protection switch Q2 is switched off.

In some other embodiments, the freewheeling switch branch 2 may include a controllable switch (coupled to the control unit 4), or more diodes, or other electronic components. The present disclosure does not limit the specific circuit form of the freewheeling switch branch 2.

In particular, taking FIG. 4A or FIG. 5 as an example, when a short-circuit and overcurrent occurs at the second DC end B, the control unit 4 controls the first protection switch Q1 to be turned off to disconnect the first DC end A and the second DC end B. At this time, the diode D1 and the anti-parallel diode of the switch Q2 may provide a freewheeling loop for the second DC end B to avoid damages to circuits and components. It should be noted that Q1 and Q2 in FIGS. 4A, 4B, 5 and 6 may adopt a same driver or different drivers. When adopting same driver, Q1 and Q2 are simultaneously switched off. That is to say, when the detection unit 3 detects the overcurrent fault, the control unit 4 can control the first protection switch Q1 and the second protection switch Q2 of the main protection branch to be turned off simultaneously, regardless of whether the overcurrent fault occurs in the first DC end A or the second DC end B. When Q1 and Q2 adopt different drivers, Q1 may be switched off, and Q2 may be switched off or Q2 may not need to be switched off, when a short-circuit and overcurrent occurs at the second DC end B. At this time, the diode D1 and the anti-parallel diode of the switch Q2 and/or switch Q2 may provide freewheeling loop for the second DC end B.

In some other embodiments, taking FIG. 4A or FIG. 5 as an example, when overcurrent occurs, and the detection unit 3 detects the overcurrent flows from the first DC end A to the second DC end B, the control unit 4 controls the first protection switch Q1 to be turned off, regardless of whether the overcurrent fault occurs in the first DC end A or the second DC end B. Further, when overcurrent occurs, and the detection unit 3 detects the overcurrent flows from the second DC end B to the first DC end A, the control unit 4 controls the second protection switch Q2 to be turned off, regardless of whether the overcurrent fault occurs in the first DC end A or the second. DC end B.

Figure 7:
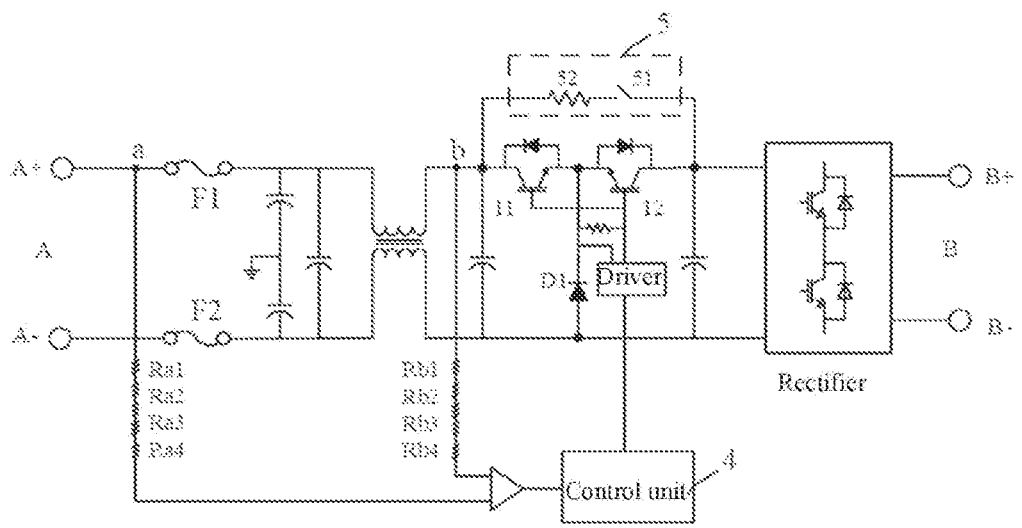
FIG. 7 is a schematic diagram of an overcurrent protection circuit according to another embodiment of the present disclosure.

FIG. 7 is a schematic diagram of an overcurrent protection circuit according to another embodiment of the present disclosure. As shown in FIG. 7, the overcurrent protection circuit further includes a current-limiting start circuit 5 connected to two ends of the main protection branch 1 in parallel. According to an embodiment of the present disclosure, the current-limiting start circuit 5 includes an auxiliary switch 51 and a current-limiting resistor 52, the auxiliary switch 51 and the current-limiting resistor 52 are connected in series. When the circuit is started for the first time, the auxiliary switch 51 is turned on firstly, the current of the bus grows slowly due to the current-limiting resistor 52, which may effectively prevent an excessive current from damaging components. When the start of the circuit is finished, the first protection switch 11 and the second protection switch 12 are turned on, and the auxiliary switch 51 is turned off. At this time, a path is formed by the main protection branch and plays a role of overcurrent protection.

The T type of overcurrent protection circuit 100 provided by the embodiments of the present disclosure may be used as main switch or load switch for converter or power module, and current-limiting start circuit is connected in parallel with overcurrent protection circuit, Which can realize surge current suppression at startup. In addition, a circuit of the diode D1, the anti-parallel diode of the switch of the main protection branch and the fuses F1 and F2 can achieve a reverse polarity protection for the DC power port (such as the first DC end A), avoiding damages to circuits and components.

Figure 8A:
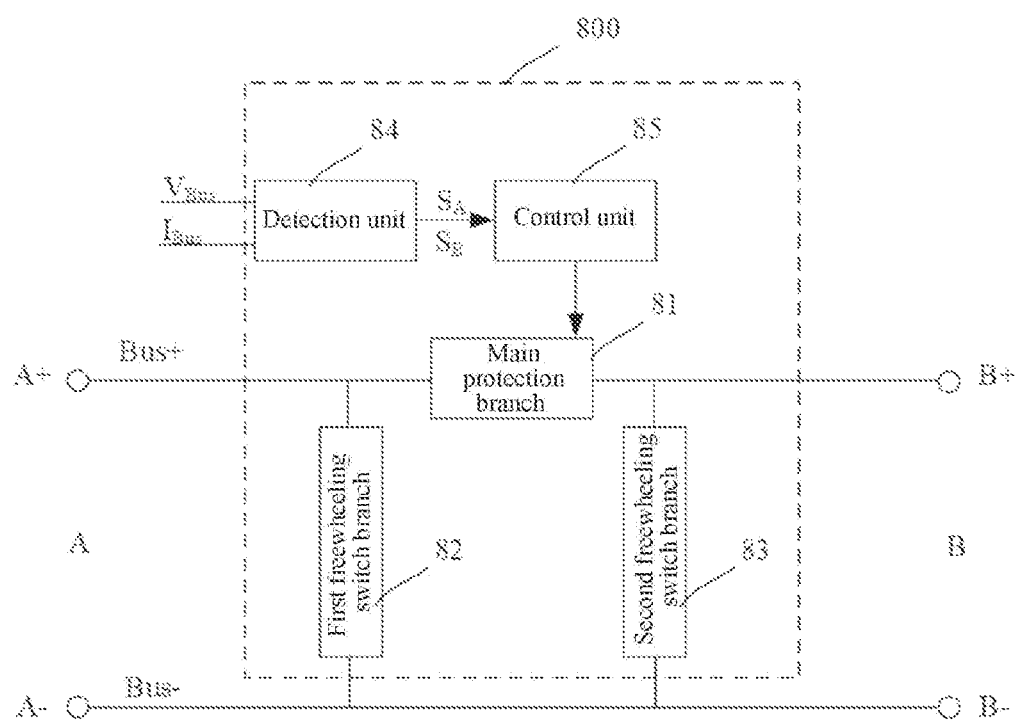
FIG. 8A and FIG. 8B are schematic diagrams of another overcurrent protection circuit according to the present disclosure.
Figure 8B:
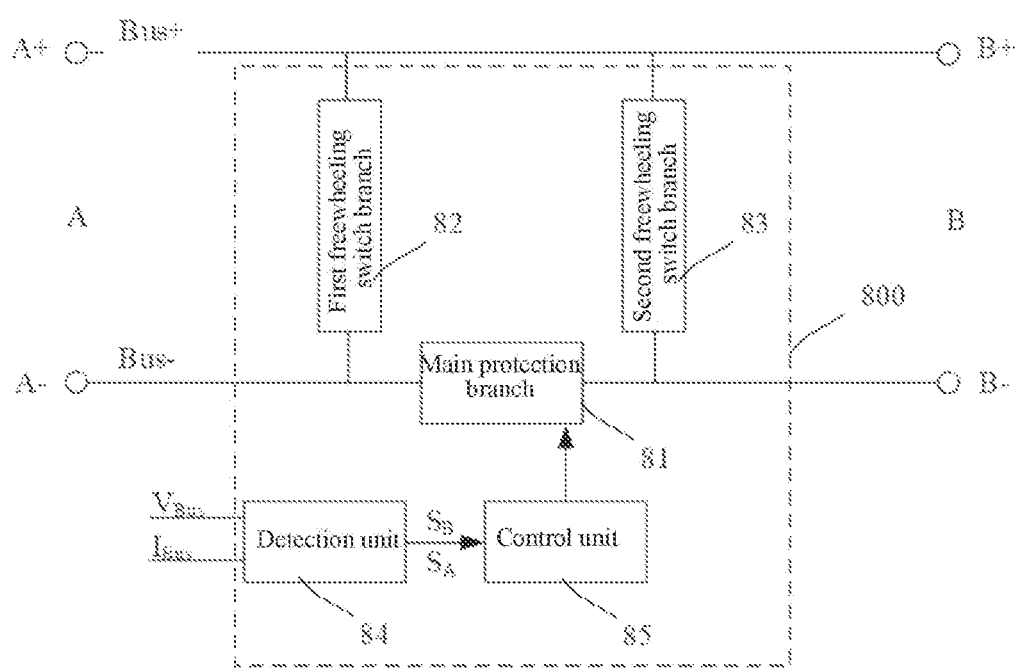

FIG. 8A and FIG. 8B are schematic diagrams of another overcurrent protection circuit according to the present disclosure. Referring to FIG. 8A and FIG. 8B, as the circuit shown in FIG. 1, the overcurrent protection circuit 800 is also coupled to a DC bus between a first DC end. A and a second DC end B, the DC bus includes a positive bus Bus+ connected between a first DC positive terminal A+ and a second DC positive terminal B+ and a negative bus Bus− connected between a first DC negative terminal A− and a second DC negative terminal B−.

Wherein, the overcurrent protection circuit 800 includes: a main protection branch 81, a first freewheeling switch branch 82, a second freewheeling switch branch 83, a detection unit 84 and a control unit 85. Wherein, the main protection branch 81 includes at least one protection switch.

As shown in FIG. 8A, the main protection branch 81 is connected to the positive bus Bus+. The first freewheeling switch branch 82 has two ends, one end is connected to a first end of the main protection branch 81, the other end is connected to the negative bus Bus−. The second freewheeling switch branch 83 has two ends, one end is connected to a second end of the main protection branch 81, the other end is connected to the negative bus Bus−.

As shown in FIG. 8B, the main protection branch 81 is connected to the negative bus Bus−. The first freewheeling switch branch 82 has two ends, one end is connected to a first end of the main protection branch 81, the other end is connected to the positive bus Bus+. The second freewheeling switch branch 83 has two ends, one end is connected to a second end of the main protection branch 81, the other end is connected to the negative bus Bus−.

The detection unit 84 is coupled to the DC bus, and detects the voltage $V_{Bus}$ or the current $I_{Bus}$ of the DC bus in real time and outputs the overcurrent detection signal for representing whether an overcurrent fault occurs. The control unit 85 is coupled with the detection unit 84 and the main protection branch 81, and controls the main protection branch 81 according to the overcurrent detection signal.

According to an exemplary embodiment of the present disclosure, the overcurrent detection signal includes a first overcurrent signal $S_A$ identifying an overcurrent happening in the first DC end A and a second overcurrent signal $S_B$ identifying an overcurrent happening in the second DC end B.

Wherein, the control unit 85 controls the main protection branch 81 to be switched off when rec V the overcurrent detection signal (whether is the first overcurrent signal $S_A$ or the second overcurrent signal $S_B$). In some embodiments, when the freewheeling switch branch 82 and/or freewheeling switch branch 83 includes a controllable switch, the control unit 85 is coupled to the first freewheeling switch branch 82 and/or the second freewheeling switch branch 83, controls the first freewheeling switch branch 82 to be switched on according to the first overcurrent signal $S_A$, and controls the second freewheeling switch branch 83 to be switched on according to the second overcurrent signal $S_B$. When the control unit 85 controls the first freewheeling switch branch 82 to be switched on according to the first overcurrent signal $S_A$, a freewheeling loop is provided for the first DC end A where an overcurrent current occurs, so the first DC end A and the second DC end B are disconnected. Similarly, when the control unit 85 controls the second freewheeling switch branch 83 to be switched on according to the second overcurrent signal $S_B$, a freewheeling loop is provided for the second DC end B where an overcurrent current occurs, so the first DC end A and the second DC end B are disconnected.

Figure 9A:
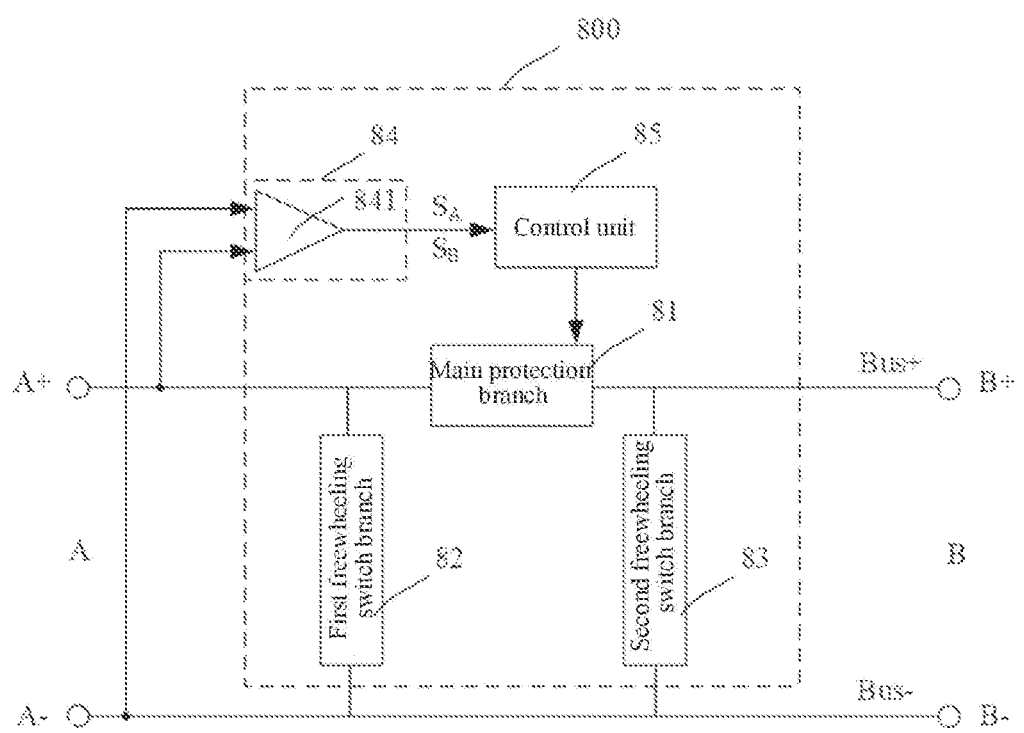
FIG. 9A and FIG. 9B are circuit connection diagrams of a detection unit according to two embodiments of the present disclosure respectively.
Figure 9B:
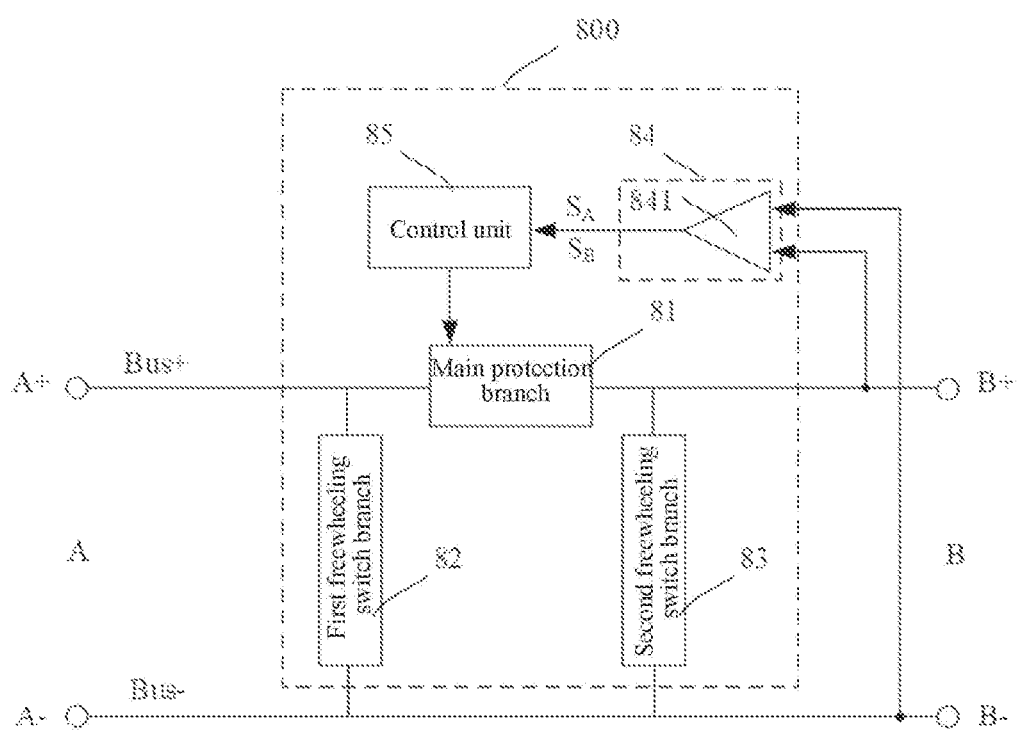

FIG. 9A and FIG. 9B are circuit connection diagrams of a detection unit according to two embodiments of the present disclosure respectively. As shown in FIG. 9A, the detection unit 84 is coupled to the positive bus Bus+ and the negative bus Bus− at the first DC end A. As shown in FIG. 9B, the detection unit 84 is coupled to the positive bus Bus+ and the negative bus Bus− at the second DC end B. The detection unit 84 detects the voltage of the bus, and outputs an overcurrent signal when the change of voltage is greater than the preset voltage threshold. For example, when the voltage change between the positive bus Bus+ and the negative bus Bus− at the first DC end A exceeds the preset voltage threshold, the first overcurrent signal $S_A$ may be output; and when the voltage change between the positive bus Bus+ and the negative bus Bus− at the second DC end. B exceeds the preset voltage threshold, the second overcurrent signal $S_B$ may be output.

In the embodiments of the present disclosure, the detection unit 84 may realize a voltage measurement between the positive bus and the negative bus via an operational amplifier 841.

In the embodiment shown in FIG. 9A, a first input end and a second input end of the operational amplifier 841 are coupled to the first DC positive terminal A+ and the first DC as negative terminal A− respectively, for detecting the voltage $V_{bus}$ between the positive bus Bus+ and the negative bus Bus− at the first DC end A. In the embodiment shown in FIG. 9B, the first input end and the second input end of the operational amplifier 841 are coupled to the second DC positive terminal B+ and the second DC negative terminal B− respectively, for detecting the voltage $V_{bus}$ between the positive bus Bus+ and the negative bus Bus− at the second DC end B.

Figure 10A:
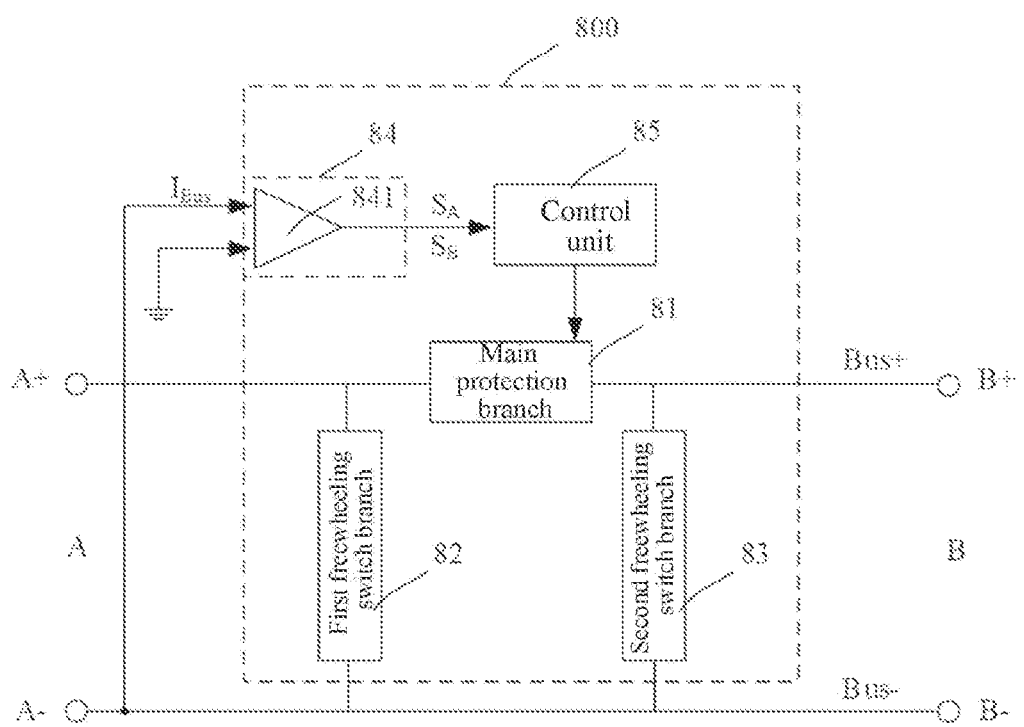
FIG. 10A and FIG. 10B are circuit connection diagrams of a detection unit according to another two embodiments of the present disclosure respectively.
Figure 10B:
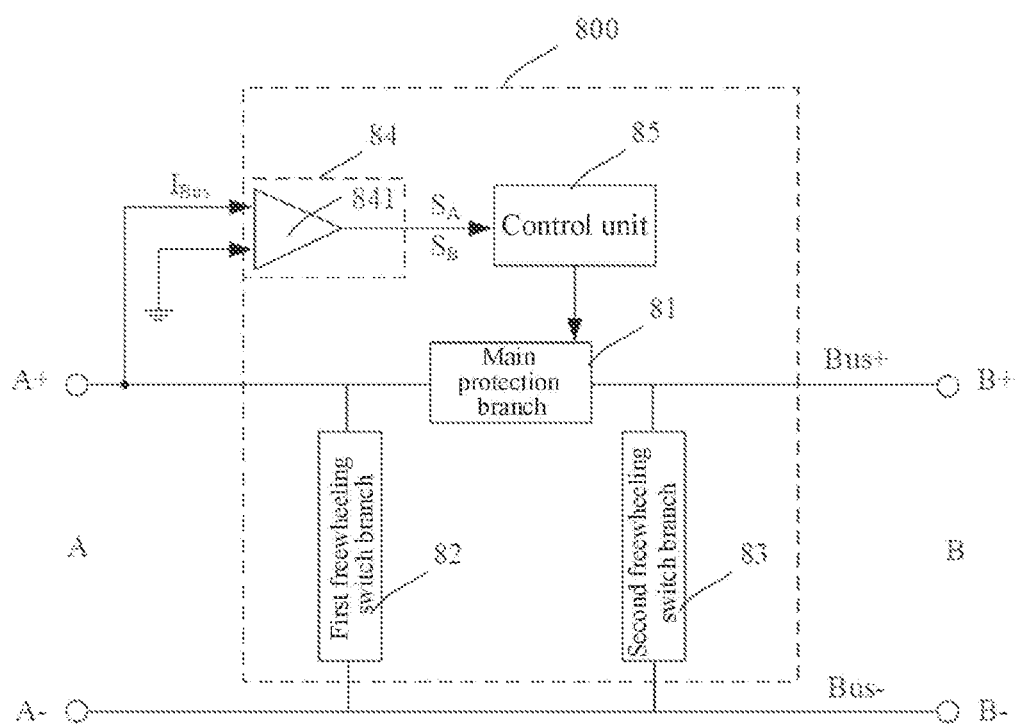

FIG. 10A and FIG. 10B are circuit connection diagrams of a detection unit according to another two embodiments of the present disclosure respectively. In the embodiment shown in FIG. 10A, the detection unit 84 is coupled to negative bus Bus−, for detecting a current $I_{bus}$ of the DC bus. Taking that the current flowing from the first DC positive terminal A+ to the second DC positive terminal B+ is positive as an example, when the current is positive and the absolute value of the current $I_{bus}$ exceeds the preset current threshold, the second overcurrent signal $S_B$ is output; or when the current $I_{bus}$ is negative and the absolute value of the current $I_{bus}$ exceeds the preset current threshold, the first overcurrent signal $S_A$ is output. Similarly, the detection unit 84 may also be coupled to the positive bus Bus+, as shown in FIG. 10B.

In the embodiments shown in FIG. 10A and FIG. 10B, a first input end of the operational amplifier 841 is coupled to the positive bus or the negative bus, and a second input end of the operational amplifier 841 is coupled to the ground, so as to determine the current direction and the current absolute value.

It should be noted that, the positive or negative of the voltage or current above-mentioned is determined with a reference of a certain direction, and if the reference or the direction is changed, the determination of positive or negative will be changed. The present disclosure does not limit this relative relationship.

Figure 11A:
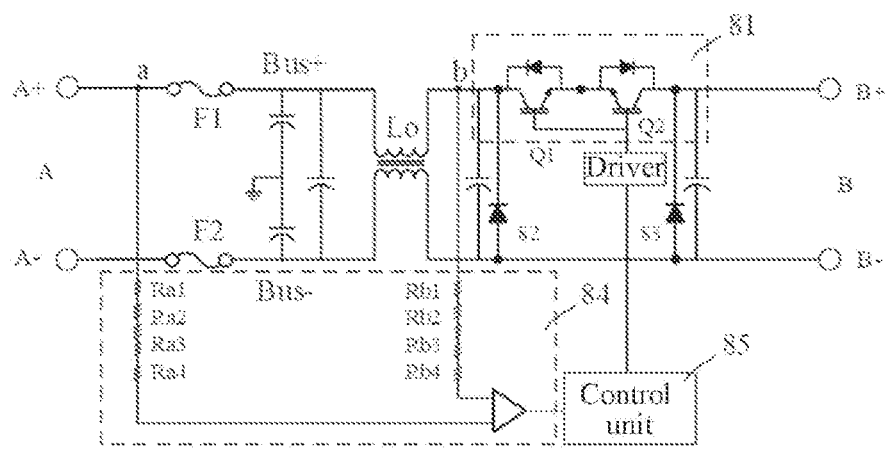
FIG. 11A and FIG. 11B are circuit connection diagrams of overcurrent protection circuits according to another two embodiments of the present disclosure respectively.
Figure 11B:
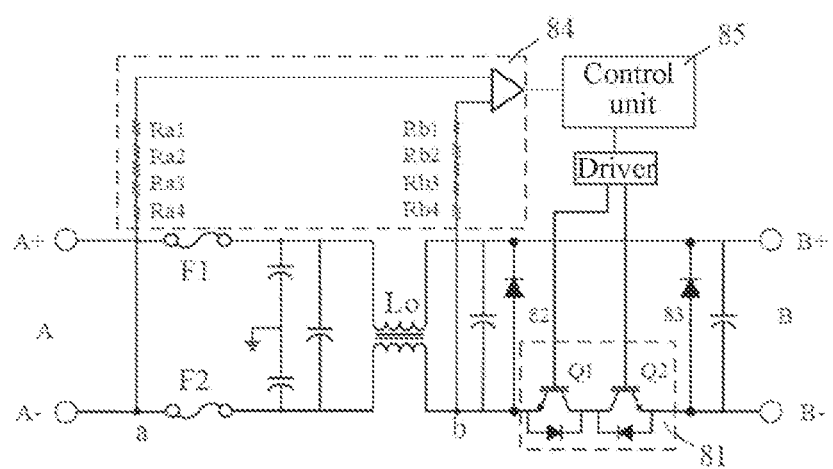

FIG. 11A and FIG. 11B are circuit connection diagrams of overcurrent protection circuit according to another two embodiments of the present disclosure respectively. Like to FIG. 4A and FIG. 4B, the first DC end A is provided with a filter inductor Lo, a filter capacitor, and positive-negative pole fuses F1 and F2. And the detection unit 84 may be coupled to two different detection positions on the positive bus Bus+ or two different detection positions on the negative bus Bus−, for detecting a voltage between the two detection positions.

As shown in FIG. 11A, the main protection branch 81 is coupled to the positive bus Bus+, the detection unit 84 is coupled to the point a before fuse F1 and the point b after filter inductor Lo on the positive bus Bus+, for detecting a voltage difference between the two points. When a voltage difference exceeds a preset positive threshold, the detection unit 84 outputs the second overcurrent signal $S_B$; or when a voltage difference exceeds a preset negative threshold, the detection unit 84 outputs the first overcurrent signal $S_A$. As shown in FIG. 11B, the main protection branch 81 is coupled to the negative bus Bus−, the detection unit 84 is coupled to point a before fuse F2 and point b after filter inductor Lo on the negative bus Bus−, for detecting a voltage difference between the two points.

Figure 12A:
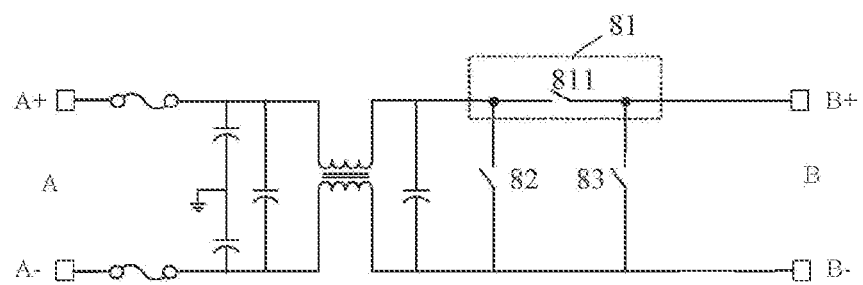
FIGS. 12A to 12D are schematic diagrams of main protection branches according to embodiments of the present disclosure.
Figure 12B:
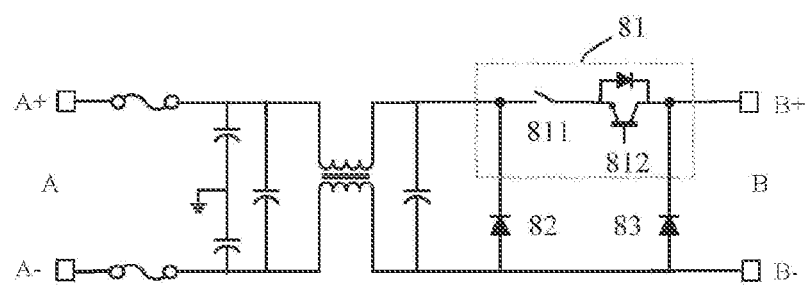

FIGS. 12A to 12D are schematic diagrams of main protection branches according to the embodiments of the present disclosure. Referring to FIG. 12A, the main protection branch 81 may include one protection switch 811. The present disclosure does not limit connection positions or quantities of resistors or other passive devices in the main protection branch 81 (there may be no other passive device). Referring to FIG. 12B, the main protection branch 81 may further include a first protection switch 811 and a second protection switch 812 which are connected in series, and the main protection branch 81 may further include more controllable switch components.

In the embodiments of the present disclosure, the type of the main protection branch 81 is not limited, and the type of the protection switch is also not limited, and all the main protection branches 81 including a controllable switch with a switching function fall within the protection scope of the present disclosure.

Figure 12C:
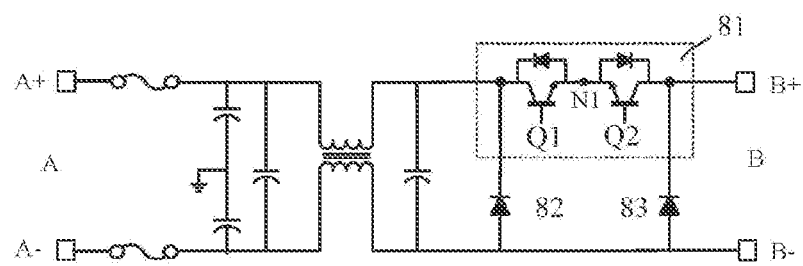
Figure 12D:
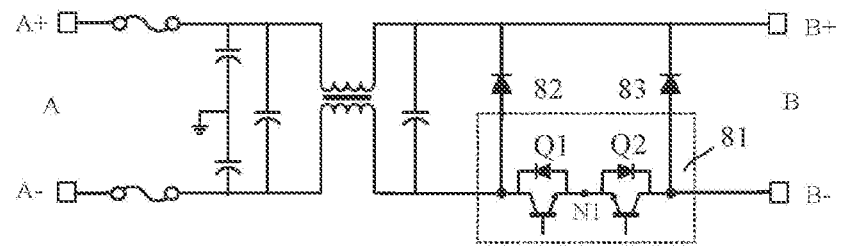

Reffering to FIG. 12C and FIG. 12D, in some embodiments, the first protection switch 811 and the second protection switch 812 are both IGBT or MOSFET, and the main protection branch 81 includes a first protection switch Q1 and a second protection switch Q2 that are connected in series, the first protection switch 811 and the second protection switch 812 both having a first end, a second end and a control end, the first protection switch Q1 and the second protection switch Q2 are reversely connected in series.

As shown in FIG. 12C, the main protection branch 81 is located on the positive bus Bus+, the second end of the first protection switch Q1 and the second end of the second protection switch Q2 are connected at the first node N1, so as to form a reverse series structure. As shown in FIG. 12D, the main protection branch 81 is located on the negative bus Bus−, the second end of the first protection switch Q1 and the second end of the second protection switch Q2 are connected at the first node N1, so as to reverse series structure. When an overcurrent occurs at the first DC end A or the second DC end B, it is necessary to turn off one protection switch that is forward conductive or turn off both the two switches. In the embodiments in FIG. 12C and FIG. 12D, the position of the first protection switch Q1 and the second protection switch Q2 are interchangeable.

Taking FIG. 11A or FIG. 12C as an example, when a short-circuit and overcurrent occurs at the second DC end B, the control unit 4 controls the first protection switch Q1 to be switched off, and disconnects the first DC end A and the second DC end B. At this time, the second freewheeling switch branch 83 may provide freewheeling loop for the second DC end B. Wherein, Q1 and Q2 may adopt same driver or different drivers. When adopting same driver, Q1 and Q2 are simultaneously switched off. When Q1 and Q2 adopt different drivers, Q1 may be switched off only, and Q2 may not need to be switched off.

In embodiments FIG. 12B-12D, the first freewheeling switch branch 82 and the second freewheeling switch branch 83 may include a diode respectively. In other embodiments, the first freewheeling switch branch 82 and the second freewheeling switch branch 83 may include more diodes or other electronic components. In other embodiments, the first freewheeling switch branch 82 and the second freewheeling switch branch 83 may include a controllable switch (coupled to the control unit 85) respectively. The present disclosure does not limit the specific circuit form of the freewheeling switch branch.

When each of the first freewheeling switch branch 82 and the second freewheeling switch branch 83 includes one or more diodes, whether the main protection branch 81 is connected to the positive bus Bus+ or the negative bus Bus−, the anode of the diode is coupled to the negative bus Bus− and the cathode of the diode is coupled to the positive bus Bus+, for providing a freewheeling loop for the first DC end A or the second DC end B where an overcurrent or a short-current occurs.

The forms of the above-mentioned various types of main protection branches and freewheeling switch branches may all be freely combined with various connection modes of the above-mentioned detection circuits, to form more embodiments within the protection scope of the present disclosure.

Figure 13:
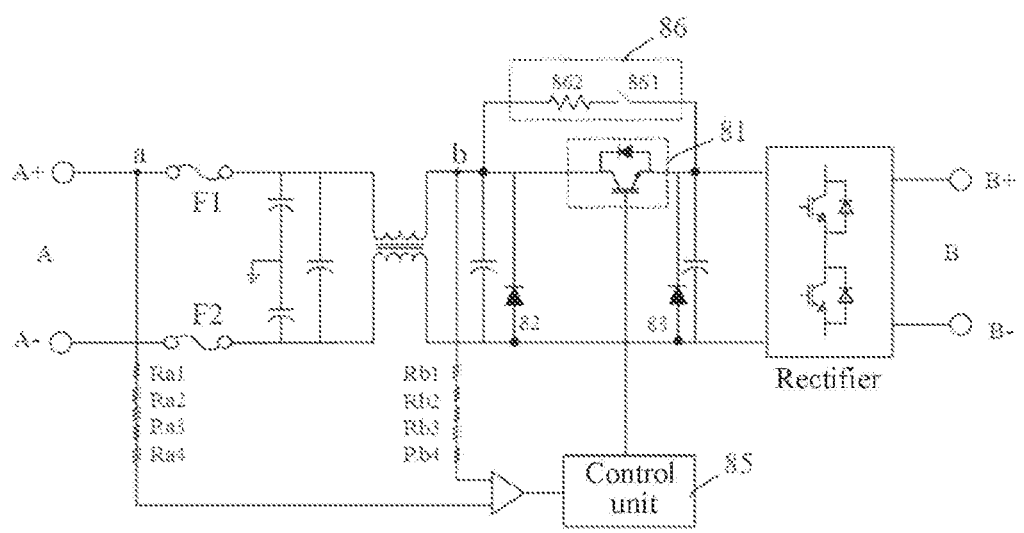
FIG. 13 is a schematic diagram of an overcurrent protection circuit according to another embodiment of the present disclosure.

FIG. 13 is a schematic diagram of an overcurrent protection circuit according to another embodiment of the present disclosure. As shown in FIG. 13, the overcurrent protection circuit further includes an current-limiting start circuit 86. The current-limiting start circuit 86 is connected to the main protection branch 81 in parallel, and a first end of the current-limiting start circuit 86 is coupled to the first DC end A and a second end of the current-limiting start circuit is coupled to the second DC end B. According to an exemplary embodiment of the present disclosure, the current-limiting start circuit 86 includes an auxiliary switch 861 and a current-limiting resistor 862 that are connected in series. When the circuit is started for the first time, the auxiliary switch 861 is switched on firstly, the current of the bus grows slowly due to the current-limiting resistor 862, which may effectively prevent an excessive current from damaging components. When the start is finished, the main protection branch 81 is switched on, and the auxiliary switch 861 is switched off. At this time, a path is formed by the main protection branch 81 and plays a role of overcurrent protection.

The π type of overcurrent protection circuit 800 provided by the embodiments of the present disclosure may be used as main switch or load switch for converter or power module, and current-limiting start circuit is connected in parallel with overcurrent protection circuit, which can realize surge current suppression at startup. In addition, freewheeling switch branches 82 or 83 may realize reverse polarity protection of the DC bus port, avoiding damages to circuits and components.

Figure 14A:
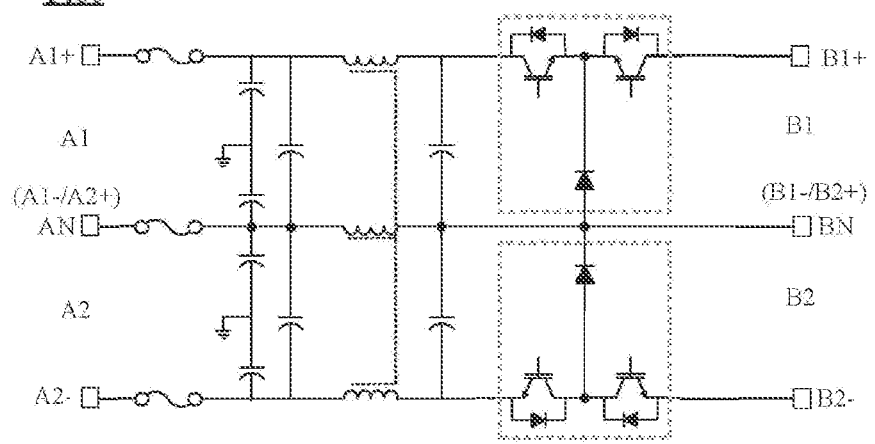
FIG. 14A and FIG. 14B are schematic diagrams of overcurrent protection circuits applied to two-port circuits according to the present disclosure.
Figure 14B:
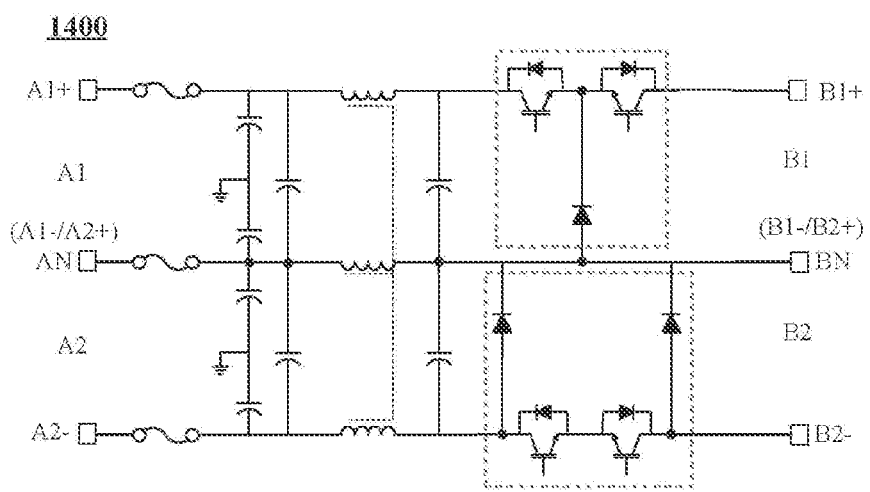

FIG. 14A and FIG. 14B are schematic diagrams of overcurrent protection circuits applied to two-port circuits according to the present disclosure. As shown in FIG. 14A and FIG. 14B, a bi-directional system 1400 may include a combined application of two two-port circuits with a T type circuit (overcurrent protection circuit 100) or a π type circuit (overcurrent protection circuit 800). The two two-port circuits may be utilized to connect to each other in series at the first DC end A and the second DC end B respectively, realizing the system 1400 with a three-line connection of a positive line, a negative line and a midline. Two same overcurrent protection circuits may be applied to the two-port circuits, as shown in FIG. 14A; and two different overcurrent protection circuits may be applied to the two-port circuits, as shown in FIG. 14B.

The input end or the output end of the bi-directional system 1400 is provided with an overcurrent protection circuit according to any one of the above.

According to the overcurrent protection circuits provided by the embodiments of the present disclosure, the control unit can realize overcurrent protection quickly by the main protection branch and the freewheeling switch branch according to a voltage or a current on the DC bus. When detecting an overcurrent occurs at a certain DC end, the current path between the DC end in fault and the other DC end is quickly cut off by the main protection branch, effectively protecting the other DC end, and the freewheeling circuit is quickly provided a loop for the DC end in fault, realizing bi-directional quick overcurrent protection and short-circuit protection. The detection method is fast and effective, and the overcurrent protection circuit acts quickly, realizing quick disconnection of the faulty end, and avoiding damages of components and devices.

Other embodiments of the present disclosure will be apparent to those skilled in the art after they refer to the specification and practice the present disclosure. It is intended that the present disclosure covers any variations, applications, or adaptations of the present disclosure, which are in accordance with the general principles of the present disclosure and include common general knowledge or conventional technical means in the art that are not disclosed in the present disclosure. The specification and embodiments are to be regarded as illustrative only, and the true scope and spirit of the disclosure are pointed out by the claims.

What is claimed is:

1. An overcurrent protection circuit, coupled to a DC bus between a first DC end and a second DC end, the DC bus comprising a positive bus connected between a first DC positive terminal and a second DC positive terminal, and a negative bus connected between a first DC negative terminal and a second DC negative terminal, comprising:
a main protection branch connected in series with the positive bus or the negative bus, and comprising a first protection switch and a second protection switch connected in series and connected to a first node on the DC bus;
a freewheeling switch branch having two ends, one end being connected to the first node, the other end being connected to an opposite bus to the main protection branch;
a detection unit coupled with the DC bus, and configured to detect a voltage or a current of the DC bus and output an overcurrent detection signal for representing whether an overcurrent occurs;
a control unit coupled to the detection unit and the main protection branch, and configured to control the main protection branch according to the overcurrent detection signal; and
a current-limiting start circuit connected to the main protection branch in parallel; wherein the current-limiting start circuit comprises an auxiliary switch and a current-limiting resistor that are connected in series.

2. The overcurrent protection circuit according to claim 1, wherein when the detection unit detects the overcurrent, the control unit controls the first protection switch and the second protection switch of the main protection branch to be turned off simultaneously.

3. The overcurrent protection circuit according to claim 1, wherein the overcurrent detection signal comprises a first overcurrent signal identifying an overcurrent fault occurring in the first DC end and a second overcurrent signal identifying an overcurrent fault occurring in the second DC end; and the control unit is configured to control the second protection switch to be turned off according to the first overcurrent signal and control the first protection switch to be turned off according to the second overcurrent signal.

4. The overcurrent protection circuit according to claim 3, wherein the detection unit is coupled to the first DC positive terminal and the first DC negative terminal, for detecting a voltage of the first DC end; or the detection unit is coupled to the second DC positive terminal and the second DC negative terminal, for detecting a voltage of the second DC end.

5. The overcurrent protection circuit according to claim 3, wherein the detection unit is coupled to the positive bus or the negative bus, for detecting the current of the DC bus.

6. The overcurrent protection circuit according to claim 3, wherein the detection unit is coupled to two different detection positions on the positive bus or two different detection positions on the negative bus, for detecting a voltage difference between the two detection positions.

7. The overcurrent protection circuit according to claim 6, wherein a filter inductor is connected with the DC bus, and the two detection positions are located before and after the filter inductor respectively.

8. The overcurrent protection circuit according to claim 7, wherein when the voltage difference between the two detection positions exceeds a preset positive threshold, the detection unit outputs the second overcurrent signal; or when the voltage difference between the two detection positions exceeds a preset negative threshold, the detection unit outputs the first overcurrent signal.

9. The overcurrent protection circuit according to claim 1, wherein the first protection switch and the second protection switch are both IGBTs or MOSFETs.

10. The overcurrent protection circuit according to claim 9, wherein the first protection switch and the second protection switch are reversely connected in series to the first node.

11. The overcurrent protection circuit according to claim 10, wherein when the overcurrent occurs, and the detection unit detects the overcurrent flows from the first DC end to the second DC end, the control unit controls the first protection switch to be turned off; and when the overcurrent occurs, and the detection unit detects the overcurrent flows from the second DC end to the first DC end, the control unit controls the second protection switch to be turned off.

12. The overcurrent protection circuit according to claim 1, wherein the freewheeling switch branch comprises a controllable switch; the control unit is electrically coupled to the controllable switch, and the control unit is configured to control the controllable switch to be switched on according to the overcurrent detection signal.

13. The overcurrent protection circuit according to claim 1, wherein the freewheeling switch branch comprises a diode;
when the main protection branch connected to the positive bus, a cathode of the diode is coupled to the first node, and an anode of the diode is coupled to negative bus; or
when the main protection branch connected to the negative bus, an anode of the diode is coupled to the first node, and a cathode of the diode is coupled to positive bus.

14. An overcurrent protection circuit, coupled to a DC bus between a first DC end and a second DC end, the DC bus comprising a positive bus connected between a first DC positive terminal and a second DC positive terminal, and a negative bus connected between a first DC negative terminal and a second DC negative terminal, comprising:
a main protection branch connected in series with the positive bus or the negative bus, and comprising at least one protection switch;
a first freewheeling switch branch having two ends, one end being connected to a first end of the main protection branch, the other end being connected to an opposite bus to the main protection branch;
a second freewheeling switch branch having two ends, one end being connected to a second end of the main protection branch, the other end being connected to an opposite bus to the main protection branch;
a detection unit coupled to the DC bus, and configured to detect a voltage or a current of the DC bus and output an overcurrent detection signal for representing whether an overcurrent occurs;
a control unit coupled to the detection unit and the main protection branch, and configured to control the main protection branch according to the overcurrent detection signal; and
a current-limiting start circuit connected to the main protection branch in parallel; wherein the current-limiting start circuit comprises an auxiliary switch and a current-limiting resistor that are connected in series.

15. The overcurrent protection circuit according to claim 14, wherein the overcurrent detection signal comprises a first overcurrent signal identifying an overcurrent fault occurring in the first DC end and a second overcurrent signal identifying an overcurrent fault occurring in the second DC end; and the control unit is configured to control the first freewheeling switch branch to be turned on according to the first overcurrent signal and control the second freewheeling switch branch to be turned on according to the second overcurrent signal.

16. The overcurrent protection circuit according to claim 14, wherein the detection unit is coupled to the first DC positive terminal and the first DC negative terminal, for detecting a voltage of the first DC end; or the detection unit is coupled to the second DC positive terminal and the second DC negative terminal, for detecting a voltage of the second DC end.

17. The overcurrent protection circuit according to claim 14, wherein the detection unit is coupled to the positive bus or the negative bus, for detecting a current of the DC bus.

18. The overcurrent protection circuit according to claim 14, wherein the detection unit is coupled to two different detection positions on the positive bus or two different detection positions on the negative bus, for detecting a voltage difference between the two detection positions.

19. The overcurrent protection circuit according to claim 18, wherein a filter inductor is connected with the DC bus, and the two detection positions are located before and after the filter inductor respectively.

20. The overcurrent protection circuit according to claim 19, wherein when the voltage difference between the two detection positions exceeds a preset positive threshold, the detection unit outputs the second overcurrent signal; or when a voltage difference between the two detection positions exceeds a preset negative threshold, the detection unit outputs the first overcurrent signal.

21. The overcurrent protection circuit according to claim 14, wherein the main protection branch comprises a first protection switch and a second protection switch that are reversely connected in series, and the first protection switch and the second protection switch are both IGBTs or MOSFETs.

22. The overcurrent protection circuit according to claim 14,
wherein the first freewheeling switch branch comprises a diode, an anode of the diode is coupled to the first DC negative terminal, and a cathode of the diode is coupled to the first DC positive terminal; and
wherein the second freewheeling switch branch comprises a diode, an anode of the diode is coupled to the second DC negative terminal, and a cathode of the diode is coupled to the second DC positive terminal.

23. A bi-directional converter, wherein an input end or an output end of the bi-directional converter is connected with an overcurrent protection circuit, the overcurrent protection circuit is coupled to a DC bus between a first DC end and a second DC end, the DC bus comprises a positive bus connected between a first DC positive terminal and a second DC positive terminal and a negative bus connected between a first DC negative terminal and a second DC negative terminal, wherein the overcurrent protection circuit comprises:
a main protection branch connected in series with the positive bus or the negative bus, and comprising a first protection switch and a second protection switch connected in series and connected to a first node on the DC bus;
a freewheeling switch branch having two ends, one end being connected to the first node, the other end being connected to an opposite bus to the main protection branch;
a detection unit coupled to the DC bus, and configured to detect a voltage or a current of the DC bus and output an overcurrent detection signal for representing whether an overcurrent occurs;
a control unit coupled to the detection unit and the main protection branch, and configured to control the main protection branch according to the overcurrent detection signal; and
a current-limiting start circuit connected to the main protection branch in parallel; wherein the current-limiting start circuit comprises an auxiliary switch and a current-limiting resistor that are connected in series.

* * * * *